Feb. 15, 1955 J. R. BIRD 2,702,368

MICROWAVE POWER MONITOR WITH FREQUENCY COMPENSATED RECTIFIER

Filed Sept. 17, 1949 4 Sheets-Sheet 1

INVENTOR

*James R. Bird*

BY *Evans & McCoy*

ATTORNEYS

Feb. 15, 1955 J. R. BIRD 2,702,368

MICROWAVE POWER MONITOR WITH FREQUENCY COMPENSATED RECTIFIER

Filed Sept. 17, 1949 4 Sheets-Sheet 2

INVENTOR
James R. Bird
BY Evans & McCoy
ATTORNEYS

Feb. 15, 1955 J. R. BIRD 2,702,368

MICROWAVE POWER MONITOR WITH FREQUENCY COMPENSATED RECTIFIER

Filed Sept. 17, 1949 4 Sheets-Sheet 3

INVENTOR

James R. Bird

BY Evans & McCoy

ATTORNEYS

INVENTOR
James R. Bird
BY Evans & McCoy
ATTORNEYS

United States Patent Office 2,702,368

Patented Feb. 15, 1955

2,702,368

MICROWAVE POWER MONITOR WITH FREQUENCY COMPENSATED RECTIFIER

James R. Bird, Chagrin Falls, Ohio

Application September 17, 1949, Serial No. 116,318

16 Claims. (Cl. 324—95)

This invention relates to electrical measuring devices for use in high frequency electrical apparatus. Power absorbing devices which exhibit substantially constant impedance characteristics over wide frequency ranges, which react as lines of infinite length without reflections or standing waves, and which can be used for terminating high frequency coaxial lines and for serving as so called "dummy" loads, have previously been proposed. Reference is made to copending application for Patent Serial No. 692,116 filed August 21, 1946, now Patent 2,552,707, issued May 15, 1951, on High Frequency Coaxial Coupling Device. Such devices customarily employ a cylindrical inner resistive element in combination with a tapered or horn shaped outer conductor, or equivalent, combined in a coaxial line unit. Coaxial resistive units of this type have been immersed in a liquid dielectric-coolant as shown in copending application Serial No. 777,516 filed October 2, 1947, now Patent 2,556,642, issued June 12, 1951, on High-Frequency Electrical Device, obtaining advantages such as increased power absorbing capacity.

The invention contemplates the combination of a line terminating unit of the constant or uniform characteristic impedance type with a capacitance voltage divider, a rectifier, and a direct current indicating instrument.

The capacitors of the voltage divider are series connected across the high or radio frequency line so that a suitable, preferably small, fraction of the radio frequency line voltage appears across one or the low element or capacitor of the divider. This voltage fraction is rectified, say by a diode connected across the low element of the capacitance divider, so that direct current voltage appears across this element. The direct current indicating instrument is connected, through suitable series resistance, across the low element of the capacitance divider.

I have previously disclosed an application of the instrument of the present invention in copending application Serial No. 72,782 filed January 26, 1949. In that case the capacitance voltage divider and the semi-conductor crystal are combined in an assembly or cartridge unit which forms the subject matter of copending application Serial No. 99,474 filed June 16, 1949, now Patent No. 2,636,120, granted April 21, 1953.

A principal object of the present invention is the provision of an instrument for making high frequency electrical measurements such as voltage and power, by accurate means operative over a wide frequency band. More specifically, it is sought to provide an electrical measuring instrument capable of functioning, by suitable calibration, as either a peak reading voltmeter or as a wattmeter which accurately indicates the power absorbing rate of a resistive load over a wide frequency range. The invention provides an arrangement by means of which readings of peak voltage or power can be made instantly at intervals or continuously, as desired.

Other objects and advantages pertaining to certain combinations and arrangements of parts set forth in the following detailed description will become apparent. This description is made in connection with the accompanying drawings forming a part of the specification. Like parts throughout the several views are indicated by the same letters and numerals of reference.

Figure 1:
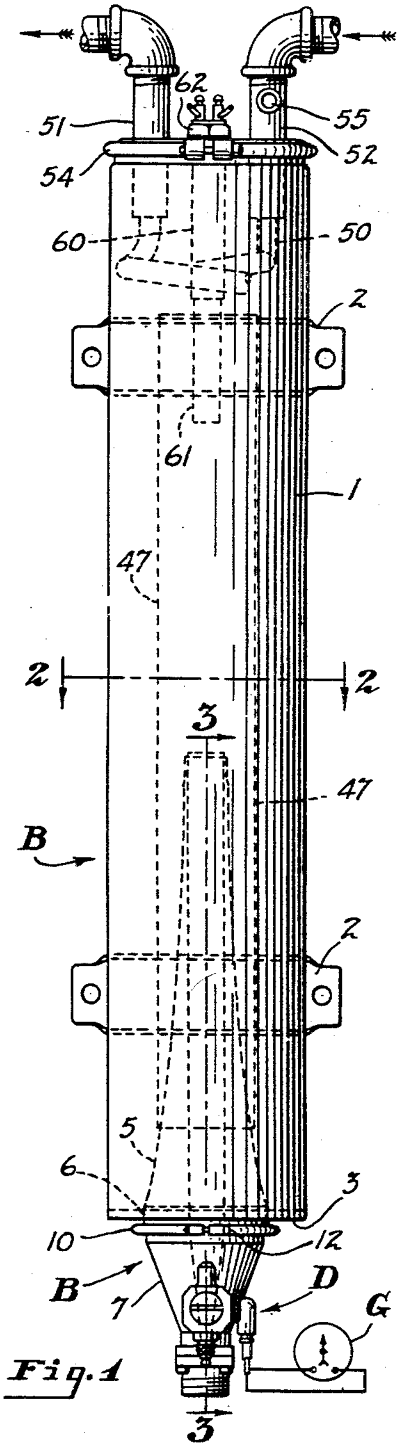
Figure 1 is an elevational view, partly diagrammatic, of a high frequency coaxial line terminating device or dummy load in combination with the voltage divider of the present invention, the combination being employed as an electrical measuring device.

The present invention is illustrated in connection with a high frequency line terminator that incorporates a resistive coaxial line unit B supported in a casing assembly A. On the tapered transition or connector end of the coaxial unit B is mounted a voltage sampling device D which incorporates a capacitance voltage divider and a rectifier. Power or energy, being related to impressed voltage, is measured and visually or otherwise indicated as by an instrument such as a galvanometer, preferably of the d'Arsonval type, connected to the voltage sampling device D and responsive to the rectified voltage.

The casing A comprises a vertically elongated outer casing or housing 1 supported by brackets 2 secured to the outside of the housing for mounting the device vertically on a wall or instrument panel.

The coaxial line unit A is constructed generally in accordance with theoretical considerations and principles heretofore set forth in the copending patent applications referred to. An outer tapered conductor or horn 5 is attached at its large diameter end to a tapered metal outer connector 7.

Circular flange 9 on cylindrical portion 8 of the outer connector and a matching surface on an integral flange 11 which surrounds the circular opening in casing closure disc 3 are embraced by a split clamping ring 10. Lugs 14 on the ends of the split ring are drawn together by screw 12.

At its small diameter end the connector 7 is formed with a tubular cylindrical portion which receives a turned fitting 16 of brass or similar metal. To this fitting is secured an externally threaded sleeve 17 which holds an insulating plug 18 having a dielectric constant substantially the same as the liquid dielectric coolant used in the casing. The metal sleeve 17 has a collar 19 welded or brazed on one end, the collar receiving screws 20 threaded into the fitting 16. The joint is made fluid-tight as by an O ring 21 of rubber or the like compressed between the sleeve 17 and a flanged retainer ring 22.

Extending longitudinally through the conductor 5 and the connector 7 is an inner conductor assembly which includes a dielectric core or tube 24 of electrical porcelain. This core is externally coated with a uniform conductive film of carbon or carbonaceous material of relatively high resistance. It is the resistance offered by this coating or inner conductor of the coaxial line unit that converts to heat the electrical energy to be absorbed.

The lower end of the ceramic tube is turned or ground to provide a reduced diameter portion received within the large diameter end of a tapered metal connector 27 formed or fitted at its small diameter end with a cylindrical rod 28 that is embraced and supported by a dielectric plug 18. The end of the rod 28 is split axially and formed for connection to the center conductor of a conventional coaxial electrical line. The threads on the tubular sleeve 17 receive the internally threaded collar of the coaxial line so that the outer conductor of such line makes electrical contact with the sleeve 17. Thus power to be absorbed or measured can be fed into the lower end of the coaxial line unit through a conventional coaxial cable.

Cylindrical portion 26 of the inner connector is electrically connected to conductive paint band 25 on the lower end of the coated ceramic tube 24 by an expansible metal band 29.

Liquid dielectric-coolant contained in the casing 1 is admitted to space 31 between the inner and outer conductors of the coaxial line through elongated axial openings or slots 30 formed in the tapered outer conductor 5. The outer conductor 5 is formed with a cylindrical upper end portion 32 separated from the outer conductive coating on the tube 24 by an annular space 36. For capacitance compensating purposes a tubular metal sleeve or element 33 is mounted coaxially within the upper end of the center conductor 24. The metal element 33 has axial slots, one of which is indicated at 34 and is formed so that in assembly the tubular element is held firmly against the inner walls of the ceramic tube.

Figure 2:
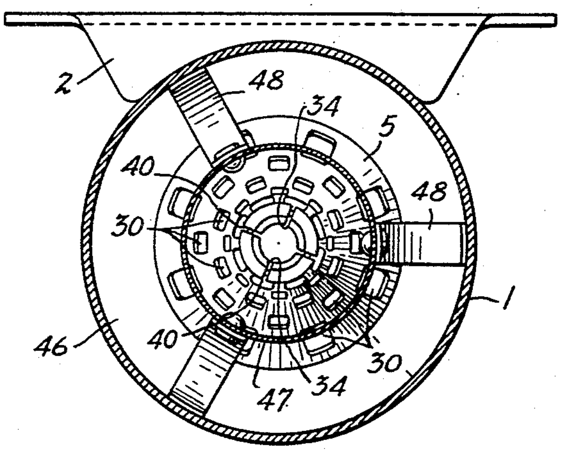
Fig. 2 is a sectional detail, with parts removed, taken substantially along the line indicated at 2—2 of Fig. 1 and enlarged with respect to that figure.

The cylindrical portion 32 of the outer conductor 5 is split as at 40 (Fig. 2) and is joined to an integral reduced diameter cylindrical collar 35 (Fig. 3) which is also axially split and tightly embraces the conductive coating 25 applied to the resistive coating on the ceramic tube 24. A matching reduced diameter portion 37 is formed on the upper end of the tubular element 33 internally of the holding collar portion 35, providing clearance 38 between the ceramic tube and the metal of the internal tubular element. An inturned circular flange 39 on the tube gripping portion 35 of the outer conductor embraces the reduced diameter end of the tubular element 33 and seats against a collar 41 formed on the latter.

Figure 3:
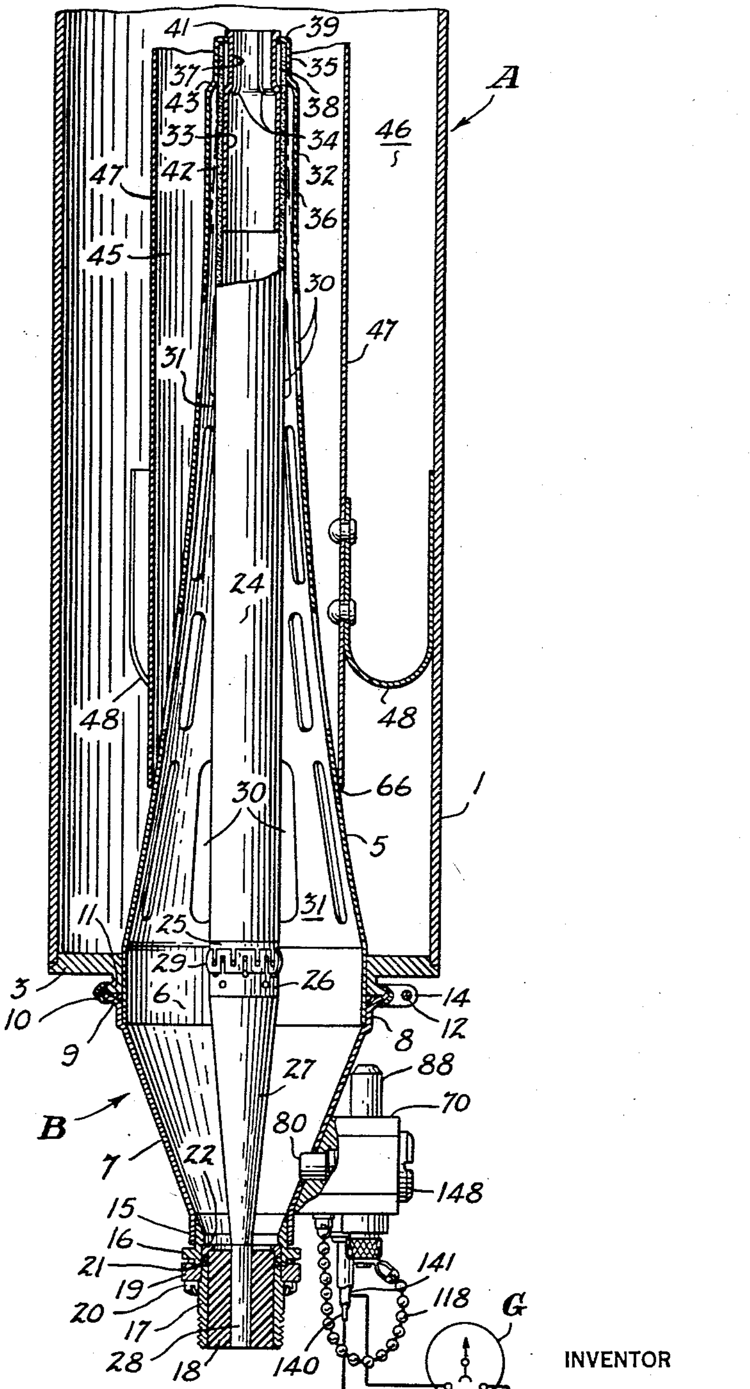
Fig. 3 is a fragmentary vertical sectional view, partly diagrammatic and with parts removed, taken substantially along the line indicated at 3—3 of Fig. 1 and enlarged with respect to that figure.
Figure 4:
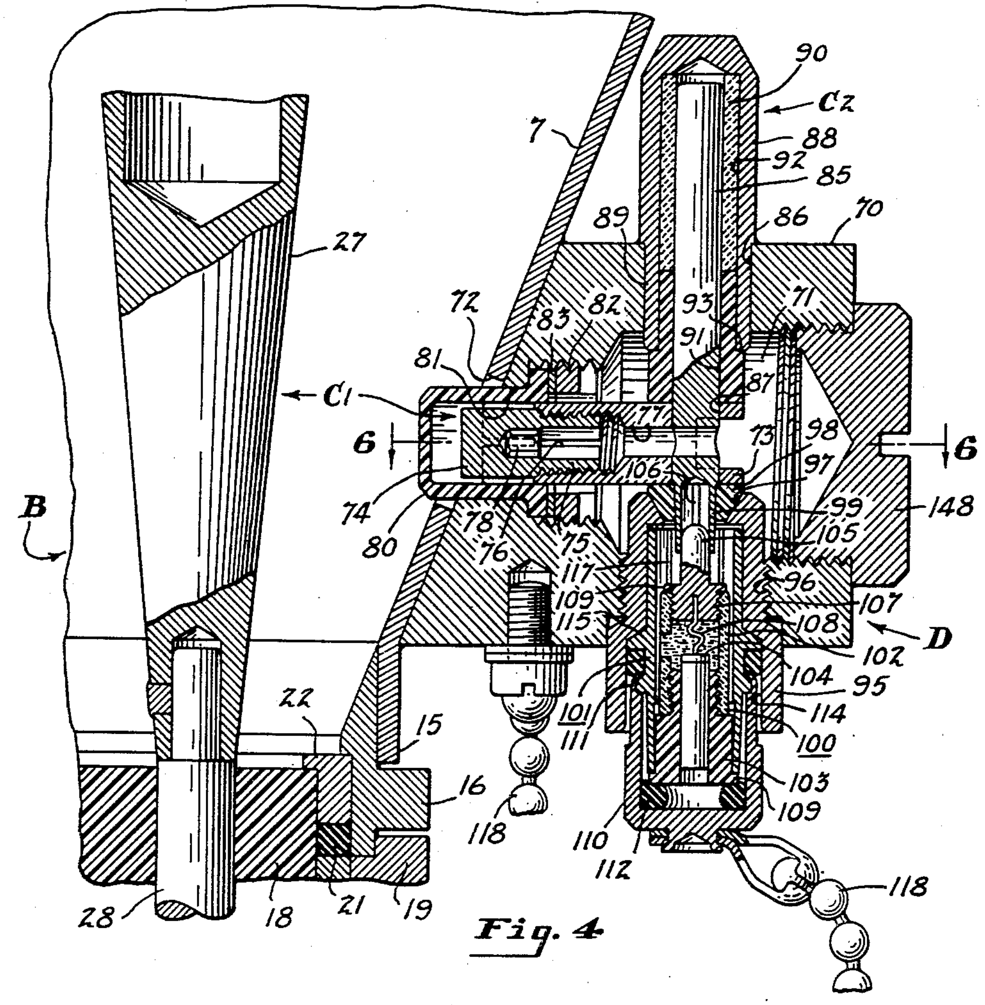
Fig. 4 is an enlarged vertical sectional detail through the voltage divider or current pick-up showing the manner in which it is mounted on the transition or connector section of the coaxial line terminating unit.

In lieu of tangential contact between the conductor 5 and the coating on the tube 24 provided by continuance of the logarithmic contour of the horn 5 as indicated by broken lines 42 of Fig. 3, the cylindrical conductor portion 32 provides a uniform annular clearance space 36. Annular shoulder 43 joins the cylindrical portion 32 of the outer conductor to the reduced diameter gripping portion 35 of the latter.

Within the casing 1 and dividing the interior thereof into an inner chamber 45 and an outer chamber 46 is a tubular chimney baffle 47 supported on the outer conductor 5 of the resistive coaxial line unit.

A number of U-shaped metal spring elements 48 are riveted to the baffle and bear resiliently against the inside of the tubular casing. In the upper end of the casing a tubular cooling coil 50 is suspended from spaced tubes 51 and 52 secured in a top closure disc sealed across the upper end of the casing as by a V-sectioned clamping ring 54 arranged similarly to the bottom clamping ring 10 previously mentioned. The ends of the coil tube 50 are sealed within the tubes 51 and 52 near the top ends of the latter and coolant is forced through the coil. A vent 55 is secured in the inlet tube 52, communicating with an annular space between the inside walls of such tube and the coil tube 50 below the seal between the tubes.

A thermal safety switch 60 is fitted at its upper end with a threaded plug 62 secured in a threaded central aperture in the top clusure disc. The switch is of the type comprising a tube 61 containing electrical contacts which function to open or separate when the tube is subjected to temperatures above that for which the device is set. Upon an increase in temperature above a predetermined safe limit of the liquid dielectric-coolant in the casing 1 the contacts in the switch are automatically opened to interrupt a conventional series safety circuit and shut down the apparatus to which the device is connected.

By reason of the substantially constant characteristic impedence of coaxial line terminators or loads of the character disclosed in the copending applications referred to, the power absorption of such devices for a given voltage is substantially constant at all frequencies encountered in practice. Measurement of the voltage across the entering end of the coaxial line device gives a value which varies with the power being absorbed. A useful power measuring instrument or wattmeter is thus obtained. A wattmeter of such character functions in accordance with the formula:

$$W=\frac{E^2}{R}$$

in which W represents the power in watts, E represents the applied potential in volts and R represents the resistance in ohms.

Since, as pointed out heretofore, the value of R represented in the present invention by the characteristic impedance of the coaxial line unit, is substantially constant for all frequencies, the power equation reduces to the following:

$$W=KE^2$$

K represents a constant over the usual operating frequencies. Measurement of the applied electrical potential or voltage as by a dial type indicating instrument is then conveniently converted as by suitable scale indicia into power or watts which are thus read directly.

Considerable difficulty has heretofore been encountered in obtaining accurate readings of voltages prevailing across coaxial lines and devices of the type herein described. It has been particularly difficult to obtain accurate readings of applied voltages when the device is utilized at different frequencies. By sampling the applied voltage and actuating a galvanometer preferably of the d'Arsonval type by the sample voltage or current a satisfactory voltage measuring arrangement has been found. It is desirable, however, to avoid interference with the high frequency current in the coaxial line such as might occur by the extension of a wire or conductor through the annular space separating the inner and outer conductors of the line. Satisfactory sampling of high frequency potentials across or at the entering end of coaxial line devices is obtained by the use of a capacitance voltage divider arrangement such as that herein disclosed. The present invention provides a combination that operates effectively over a wide frequency range such as that in which the wattmeter normally is used. The voltage divider, indicated generally at D, provides direct current to the galvanometer circuit proportional to the potential or voltage of the high frequency current flowing into the coaxial line terminating device. A chambered or hollow body 70, formed of brass or similar conductive metal, is contoured on one side to conform to the outer surface of the connector 7 and is attached to the connector as by soldering or brazing. The body is formed with a central chamber 71 which communicates with the annular space between the center connector 27 and the tubular connector 7 through an opening 72 formed in the latter.

Supported within the body 70 is a tree structure comprising a conductive metal stem 73 having a number of angularly disposed radial branches. Slidably received in one end of the stem 73 is an adjustable metal probe 74 which projects into and through the opening 72 into the space between the inner and outer connectors of the coaxial line. This probe and the inner or center conductor of the coaxial line B comprise an adjustable capacitor or condenser C–1 to be later referred to in connection with the operation of the wattmeter. The cylindrical probe has a threaded end 75 screwed into the stem 73. The threaded end of the probe is axially slotted as indicated at 76 so that the parts are frictionally restrained against relative turning and the probe 74 is retained in whatever desired position of adjustment to which it is turned. Such turning adjustment is effected by means of a hex ended rod passed axially into the stem 73 through a bore 77 and received in a mating hex socket 78 formed in the body of the probe 74, the body 70 being provided with an aligned opening into the chamber 71.

The ends of the probe and the stem are received and enclosed in a cylindrical flanged cup 80 formed of a relatively stiff insulating material such as polytetrafluoroethylene. This cup extends through passage 81 in the connector 7 and into the annular space between the coaxial line connectors. A threaded counterbore at the inner end of the body passage 81 receives a threaded washer 82 which compresses a washer 83 against the flanged end of the cup 80 to hold the cup in place and to provide a fluid-tight seal.

A cylindrical circular sectioned rod or condenser element 85, disposed at a right angle to the stem 73, extends laterally through a radial opening 86 in the body 70. The rod 85 is received in a transverse hole 87 drilled through the stem 73 and is secured as by soldering. A conductive metal cap or outer condenser element 88 is received over the outer end of the rod 85 and is formed with a reduced diameter end 89 press fitted into the radial passage 86. A ceramic insulating sleeve 90 surrounds the center capacitor element or rod 85 and serves as a dielectric between inner element 85 and outer element 88 of a coaxial condenser structure C–2. The inner element or rod of the capacitor is provided at its inner end with a yieldable dielectric sleeve 91. A reduced diameter portion on one end of the yieldable sleeve 91 is received within circular bore 92 of the capacitor cap and annular shoulder 93 of the insulating sleeve seats against the end of the capacitor cap to locate the parts in assembly.

A current rectifier assembly in the form of a dry point contact rectifier, also identified as a converter crystal or a crystal diode includes a tubular retainer or sleeve 95 which has a threaded central portion received and held in a threaded radial passage 96 diametrically opposite and axially aligned with the capacitor passage 86. The inner end of the crystal retainer 95 is formed with a tapered seat 97 engaged by dielectric washer 98 received about tubular end portion 99 of the rod 85.

Within the retainer 95 a removable conductive metal sleeve 101 holds a crystal rectifier unit 100. In one end of hollow ceramic insulating tube 102 a threaded base plug 103 holds an adjustable brass rod on the inner end of which is mounted a germanium or other semiconductor crystal 104. Such crystal is of the type having current rectifying properties, silica, galena or lead sulphide also being suitable materials. The other end of the tube 102 receives a threaded metal plug 107 which carries a spring-like whisker wire 108 that makes point contact with a sensitive spot of the crystal 104. The cavity in the tube 102 is filled through a lateral opening with wax.

The crystal unit 100 is held in place by a conductive metal cap 110 having a thin edge 111 flanged over an annular rib on the sleeve 101. A rubber O-ring 112 interposed between the cap 110 and the crystal unit 100 holds flange 109 of the plug 103 seated against the end of the sleeve 101.

Annular rib 115 on the sleeve 101 seats against the end of counterbore 114 in the retainer sleeve 96 to locate the crystal holding sleeve in the assembly, rubber O-ring 116 providing a seal. The inner end of the crystal holding sleeve 101 is axially slotted as indicated at 117 to provide a plurality of tines which frictionally engage the walls of the retaining sleeve 95. A link chain 118 connects the cap 110 to the body 70 of the capacitance voltage divider. A suitable converter crystal rectifier is one known in the electronics trade as type 1N21B which operates satisfactorily at rectified currents of about one milliampere and rectified voltages of about one volt.

A resistor R, of the insulated carbon or metalized type, is connected in series between the stem 73 and one terminal of the galvanometer G, the other terminal of the galvanometer being connected to the body 70 of the sampling device or voltage divider D. The resistor may be a conventional carbon or metalized coating type encased within an insulating body 122. Conductor wires are electrically connected to the ends of the metalized coating. Conductor wire 123 from one end of the resistor is connected to the stem 73, the other end of the resistor being connected by conductor wire 124 to a metal terminal plug 125.

The terminal plug 125 is supported as by a body 126 of phenolic resin insulation held by a press fit in externally threaded tubular fitting 127 screwed into a lateral or radial opening in the body 70. The inner end of the passage through the tubular fitting 127 is counterbored to receive a circular capacitor C–3 of the button type. This capacitor may comprise a centrally apertured circular disc of glass, mica or other insulation separating flanged metal plates. A plate on one side makes electrical connection with the wire 124 through a metal ferrule disposed in a central aperture of the insulator disc. A plate on the other side of the insulator disc, insulated by the disc from the first mentioned plate, makes electrical connection with the walls of the counterbore in the metal tube 127 through a metal ring 132.

One function of the capacitor button C–3 is to by-pass the radio or high frequency components of the electrical current in the tree structure and thereby restrict the external galvanometer circuit to the direct current produced by the effect of the crystal rectifier 100. It has been found satisfactory to employ such a condenser having a capacity of about 500 M. M. F.

Over the outer opening of the tubular fitting 127 is received a side opening metal connector fitting 133 having a threaded metal swivel collar 134 which engages the threads on the tubular fitting 127. A helical coil compression spring 135 of conductive metal is disposed within a side opening chamber in the upper end of the fitting 123, the spring being insulated from the walls of the metal fitting by a disc 136 and a dielectric cup 137. A resilient rubber O-ring 138 is interposed between the side face of the fitting 133 and the end face of the tubular fitting 127. Electrical connection is established between the swivel fitting 133 and the body 70 of the voltage divider D by the metal of the tubular fitting 127 and the collar 134.

The galvanometer G is connected to the voltage divider D preferably by means of a coaxial cable comprising a central wire or conductor 140 and a flexible sheath 141 of woven wire or the like. The center conductor of the coaxial cable is surrounded by a tube 142 of dielectric insulating material. A protective sheath or covering 143 of suitable wear resistant composition surrounds the woven conductor 141. The center conductor 140 and the tubular insulation 142 are received in a bore 145 formed in the swivel end fitting 133. The end of the center conductor 140 is bared and extends through a lateral opening in the insulating cup 137, being received and pinched between adjacent turns of the metal coil spring 135 which thus makes electrical connection therewith. A threaded ferrule 146 surrounds the flexible cable and compresses jam washers in a tapered counterbore to clamp the end of the flexible cable. Reference is made to copending application for United States Patent Serial No. 173,776, filed July 14, 1950, for Electrical Connector, describing and claiming the cable connecting means.

Figure 5:
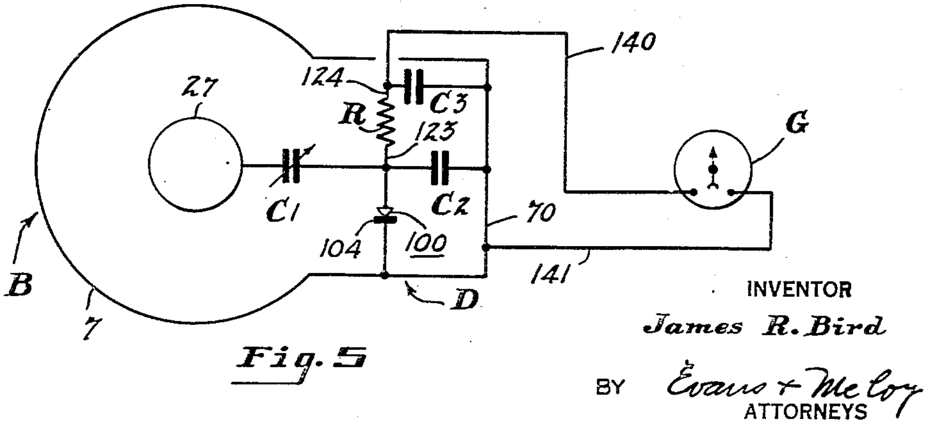
Fig. 5 is a diagrammatic representation of the components of the high frequency energy measuring device.
Figures 6, 7:
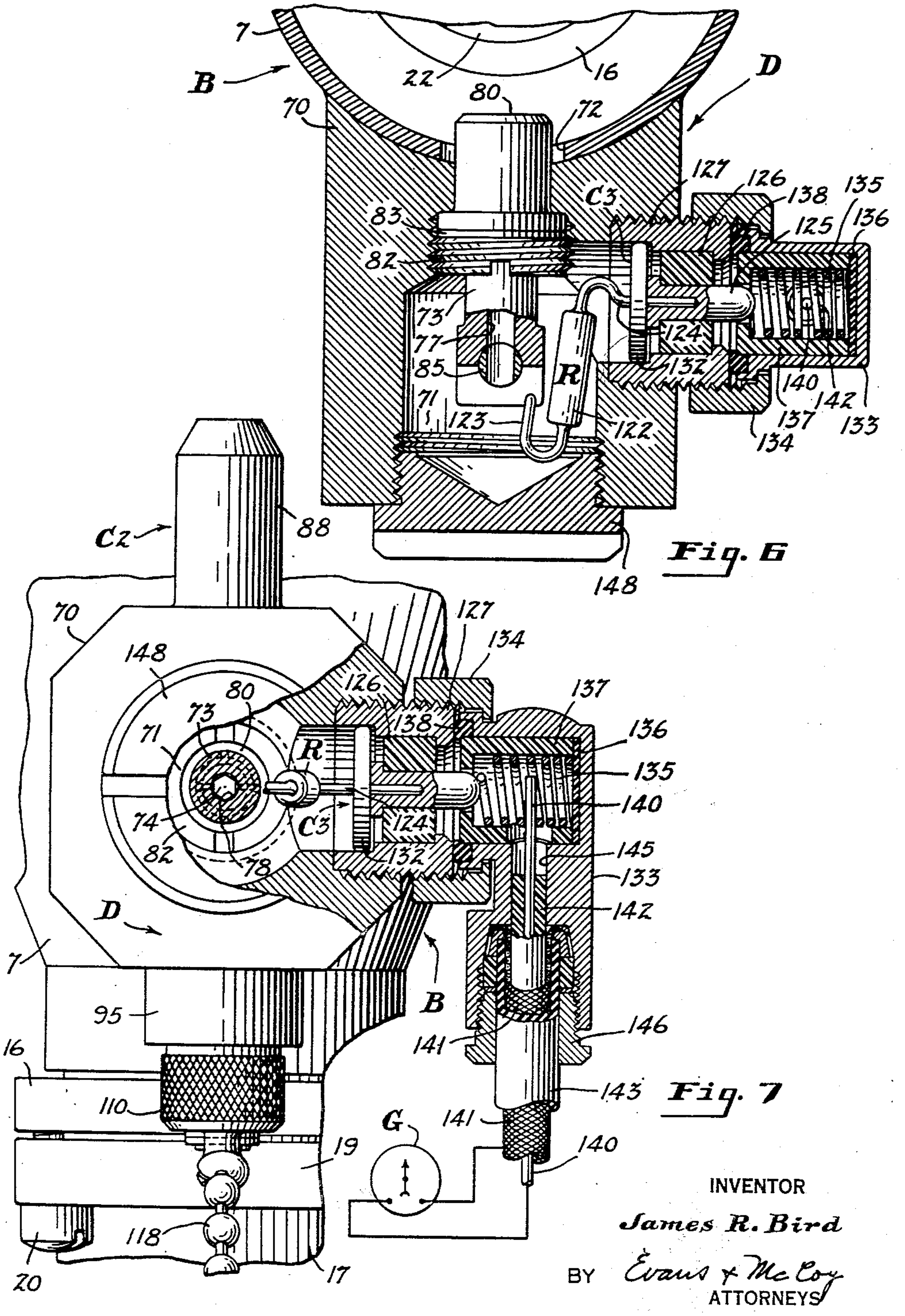
Fig. 6 is an enlarged sectional detail, with parts removed, taken substantially along the line indicated at 6—6 of Fig. 4.
Fig. 7 is an enlarged elevational detail, partly diagrammatic, partly in section and with parts broken away and removed, showing the voltage divider assembly and means for connecting the same to the galvanometer.

In connecting the galvanometer G in series between the body of the voltage divider D and the resistor R, one terminal of the galvanometer is connected to the center conductor 140 and the other terminal is connected to the conductive sheath or outer conductor 141 of the coaxial cable, these parts being diagrammatically represented in Fig. 5.

After assembly of the voltage divider D the chamber 71, which is formed with an opening through the end of the body 70, is closed as by a threaded metal plug 148.

In the operation of the described device in accordance with the principles of the present invention for the purpose of measuring electrical energy, current, or voltage, the coaxial line B is connected to the output of a suitable high frequency power generating device such as a television transmitter, the connection being made to the tubular fitting 17 and the center conductor 28 in accordance with conventional practice. Power thus fed into the device is converted into heat and suitably dissipated.

The high frequency voltage across the input end of the coaxial load B between the center tapered connector 27 and the surrounding or outer tapered connector 7, is divided between the condensers C–1 and C–2 inversely proportional to the capacitances of the respective condensers. Capacitance C–1, comprising the inner connector 27 and the pick-up or probe 14, is relatively small with respect to the coaxial condenser C–2. Accordingly the high frequency voltage across C–2 is a small fraction or sample of the total voltage impressed upon the device. The voltage across the crystal rectifier 100, being the same as the voltage across the condenser C–2, is a small sample or fraction of the main voltage applied across the coaxial line B. This arrangement keeps the voltage impressed on the crystal rectifier within its operating range.

The capacitor C–2 is charged by the action of the crystal diode rectifier to a direct current voltage substantially equal to the peak value of the high frequency voltage prevailing, through the action of the capacitance voltage divider, across the capacitor C–2. The movable hand or pointer or the galvanometer G indicates or measures such direct current voltage across the capacitor C–2, the galvanometer including in its circuit the resistor R located within the chamber 71 of the voltage divider body. A physically or dimensionally short connection is desired between the resistor R and the capacitor C–2 to minimize distributed capacitance and inductance effects along this connection.

The capacitor C-3 is a by-pass for the external galvanometer circuit, such by-pass isolating the galvanometer from high frequencies within the body of the voltage divider and preventing high frequencies picked up externally by the galvanometer circuit from entering the voltage divider chamber and affecting the crystal circuit. Resistor R and the by-pass capacitor C-3 may also be considered as a resistance-capacitance filter introduced for high frequency attenuation between the capacitor C-2 and the external galvanometer circuit. The time constant of the combination RC2 is kept sufficiently high so that the direct current and peak high frequency voltages across C-2 remain substantially equal, this arrangement being provided so that the galvanometer and crystal circuit operates as a peak reading diode voltmeter.

The action of the crystal and other circuit elements described herein is to produce in the galvanometer G a small direct current proportional to the high frequency voltage across the coaxial resistor device D. The galvanometer, by suitable calibration of its dial, thus indicates directly the high frequency power being absorbed.

One of the characteristics of crystal rectifiers of the type used in the present device is sensitivity increase or current output increase upon increase in the frequency of the alternating electric current applied to the crystal. This characteristic is exhibited over the frequency range below the natural frequency of the crystal. Thus, in the range below such natural frequency an increase in the direct current output of the crystal occurs as the frequency of the high frequency current in the coaxial device increases. This increase in current output from the crystal occurs even though the potential or voltage of the high frequency alternating current remains constant. It is believed that the physical construction of the crystal unit, which combines a whisker wire with a semi-conductor mineral, produces a resonant effect that gives rise to the sensitivity referred to. Compensation for this frequency responsive sensitivity of the crystal is obtained in the present wattmeter or voltage measuring instrument by the construction and arrangement of the capacitor C-2 which is in the form of a coaxial stub having characteristics over the designed frequency range of the device that compensate for the changes in crystal sensitivity over the same frequency range.

Upon an increase in frequency the coaxial stub capacitor characteristically decreases in impedance as measured across its input end. Thus the coaxial capacitor response tends to drop off as its relative electrical length increases or approaches one quarter wave. By electrically connecting the crystal rectifier and the coaxial stub capacitor in parallel, in the manner shown, the responses of the two components being balanced against one another over the designed frequency range as by adjustment of the electrical length of C-2, the capacitor has the effect of compensating for the changes in rectifier sensitivity of the crystal to obtain a response or output from the sampling device D which is substantially constant over a wide frequency range.

In accordance with the patent statutes the principles of the present invention may be utilized in various ways, numerous modifications and alterations being contemplated, substitution of parts and changes in construction being resorted to as desired, it being understood that the particular apparatus and combination shown in the drawings and described above and the particular method set forth are given merely for purposes of explanation and illustration without intending to limit the scope of the claims to the specific details disclosed.

What I claim and desire to secure by Letters Patent of the United States is:

1. In combination in a high frequency electrical measuring instrument for operating over a relatively wide frequency range, a coaxial line comprising spaced inner and outer conductors, a hollow conductive body mounted in fixed relation to the line, a probe, a crystal rectifier, a relatively high resistance element and means providing a first capacitance substantially in the form of an open coaxial line stub capacitor all carried by the conductive body, shielded thereby, and connected together substantially at a common point within such body, the coaxial line stub capacitor having an electrical length less than one quarter wave length over the operating frequency range of the instrument, the probe being insulated from the conductive body and extending from the interior thereof into the space between the conductors of the line to constitute with the inner conductor a second capacitance in series with the stub capacitor, the stub capacitor means characteristically decreasing in impedance upon an increase in frequency over said operating frequency range the stub capacitor and the crystal rectifier also being connected to the conductive body so that the high frequency voltage prevailing across the line at the region of the probe is divided between the first and second capacitances and the crystal rectifier and the resistance element maintain a direct current charge on the stub capacitor substantially in constant proportion to the prevailing high frequency voltage, and a direct current indicator connected between the conductive body and the resistance element, said indicator being responsive to the charge on the stub capacitor.

2. In combination in a high frequency electrical measuring instrument for operating over a relatively wide frequency range, a coaxial line comprising spaced inner and outer conductors, a hollow conductive body mounted in fixed relation to the line, a probe, a crystal rectifier, a relatively high resistance element and means providing a first capacitance substantially in the form of an open coaxial line stub capacitor all carried by the conductive body, shielded thereby, and connected together substantially at a common point within such body, the coaxial line stub capacitor having an electrical length less than one quarter wave length over the operating frequency range of the instrument, the probe being insulated from the conductive body and extending from the interior thereof into the space between the conductors of the line to constitute with the inner conductor a second capacitance in series with the stub capacitor, the stub capacitor and the crystal rectifier also being connected to the conductive body so that the high frequency voltage prevailing across the line at the region of the probe is divided between the first and second capacitances and the crystal rectifier and the resistance element maintain a direct current charge on the stub capacitor substantially in constant proportion to the prevailing high frequency voltage, the crystal rectifier being characterized by increased sensitivity upon increase in frequency of the prevailing voltage over said operating frequency range and the stub capacitor being characterized by decreased impedance upon such frequency increase whereby to mutually compensate for frequency changes over said operating frequency range, and a direct current indicator connected between the conductive body and the resistance element, said indicator being responsive to the charge on the stub capacitor.

3. In combination in a high frequency electrical measuring instrument for operating over a relatively wide frequency range, a coaxial line comprising spaced inner and outer conductors, a plurality of capacitances series connected across the line, one capacitance comprising substantially an open coaxial line stub, a rectifier connected in parallel across one capacitance, the rectifier being characterized by an increase in sensitivity upon an increase in frequency of the current prevailing across the line over said operating frequency range and the stub capacitor being characterized by decreased impedance upon such frequency increase whereby to mutually compensate for frequency changes over said operating frequency range, and a direct current indicator connected across the stub capacitor.

4. In combination in a high frequency electrical measuring instrument designed for use over a relatively wide frequency range, a hollow transmission line, a hollow conductive body mounted on the line, a probe insulated from the conductive body and extending from the interior thereof to the interior of the line, a coaxial stub capacitor shielded by the conductive body and including an elongated center element, the coaxial line stub capacitor having an electrical length less than one quarter wave length over the operating frequency range of the instrument, the stub capacitor characteristically decreasing in impedance upon an increase in frequency over the designed frequency range of the instrument and being connected between such body and the probe, and a frequency sensitive rectifier and a circuit which includes a direct current indicator connected in parallel across the coaxial stub capacitor, the probe, the rectifier and the indicator circuit all making electrical connection with the center element of the coaxial capacitor at a common end of the latter.

5. In combination in a high frequency electrical measuring instrument designed for use over a relatively wide frequency range, a hollow transmission line, a hollow conductive body mounted on the line, a probe insulated from the conductive body and extending from the interior thereof to the interior of the line, a coaxial stub capacitor and a crystal rectifier both shielded by the conductive body and each connected between such body and the probe in parallel relation to one another, the coaxial line stub capacitor having an electrical length less than one quarter wave length over the operating frequency range of the instrument, and a circuit including a direct current indicator external to the conductive body connected between the conductive body and the probe in parallel relation to the stub capacitor and the rectifier, the stub capacitor characteristically decreasing in impedance upon an increase in frequency over the designed frequency range of the instrument and including an elongated center element, and the probe, the rectifier and the indicator circuit all making electrical connection with the center element of the stub capacitor at a common end of the latter.

6. In combination in a high frequency electrical measuring instrument designed for use over a relatively wide frequency range, a hollow transmission line, a hollow conductive body mounted on the line, a probe insulated from the conductive body and extending from the interior thereof to the interior of the line, a coaxial stub capacitor and a crystal rectifier both shielded by the conductive body and each connected between such body and the probe, the coaxial line stub capacitor having an electrical length less than one quarter wave length over the operating frequency range of the instrument, and a circuit including a direct current indicator external to the conductive body and connected to such body and a relatively high resistance element in series with said indicator, the resistance element being located within and shielded by the conductive body and having one side connected to the probe, the stub capacitor characteristically decreasing in impedance upon an increase in frequency over the designed frequency range of the instrument and including an elongated center element, and the probe, the rectifier and the indicator circuit all making electrical connection with the center element of the stub capacitor at a common end of the latter.

7. In combination in a high frequency electrical measuring instrument designed for use over a relatively wide frequency range, a hollow transmission line, a hollow conductive body mounted on the line, a probe insulated from the conductive body and extending from the interior thereof to the interior of the line, a coaxial stub capacitor and a crystal rectifier both shielded by the conductive body and each connected between such body and the probe in parallel relation to one another, the coaxial line stub capacitor having an electrical length less than one quarter wave length over the operating frequency range of the instrument, and a circuit comprising a direct current indicator external to the conductive body and connected to such body and a relatively high resistance element in series with said indicator, the resistance element being located within and shielded by the conductive body and having one side connected to the probe, the stub capacitor characteristically decreasing in impedance upon an increase in frequency over the designed frequency range of the instrument and including a center element making electrical connection with the probe substantially at a point common to the connections of the rectifier and of said one side of the resistance element, and the indicator circuit also including a high frequency by-pass capacitance connected between the conductive body and the other side of the resistance element.

8. In combination in a high frequency electrical measuring instrument designed for use over a relatively wide frequency range, a hollow termination for a transmission line, said termination exhibiting substantially constant impedance characteristics over a relatively wide high frequency range, a hollow conductive body mounted on the termination, a probe insulated from the conductive body and extending from the interior thereof to the interior of the termination to derive energy from an electrical field within the termination, a coaxial stub capacitor connected between the probe and the conductive body, the coaxial line stub capactitor having an electrical length less than one quarter wave length over the operating frequency range of the instrument, the capacitor having an elongated center element and being characterized by decreased impedance upon an increase in frequency of electrical energy in the termination over the designed frequency range of the instrument, a rectifier connected in parallel across the capacitor, the rectifier being characterized by an increase in sensitivity upon such frequency increase whereby the stub capacitor and the rectifier mutually compensate for frequency variations, and a circuit including an indicator connected to respond to direct current through the rectifier.

9. In combination in a high frequency electrical measuring instrument designed for use over a relatively wide frequency range, a hollow termination for a transmission line, said termination exhibiting substantially constant impedance characteristics over a relatively wide high frequency range, an insulated probe supported on the termination and extending to the interior of the termination to derive energy from an electrical field within the latter, a coaxial stub capacitor connected between the probe and the termination, the coaxial line stub capacitor having an electrical length less than one quarter wave length over the operating frequency range of the instrument, said capacitor being characterized over the designed frequency operating range of the instrument by decreased impedance upon an increase in frequency of electrical energy in the termination, and a circuit connected to the capacitor and including a rectifier characterized by an increase in sensitivity upon frequency increase over said designed frequency range whereby the capacitor and rectifier mutually compensate for frequency variations, said circuit also including an indicator connected to respond to direct current through the rectifier.

10. In combination in a high frequency electrical instrument designed for use over a relatively wide frequency range, a hollow transmission line, an insulated probe supported on the line and extending to the interior of the line to derive energy from an electrical field within the latter, a coaxial stub capacitor connected between the probe and the line, the coaxial line stub capacitor having an electrical length less than one quarter wave length over the operating frequency range of the instrument, said capacitor being characterized over the designed frequency operating range of the instrument by decreased impedance upon an increase in frequency of electrical energy in the line, and a circuit connected to the capacitor and including a rectifier characterized by an increase in sensitivity upon frequency increase over said designed frequency range whereby the capacitor and rectifier mutually compensate for frequency variations, said circuit also including an indicator connected to respond to direct current through the rectifier.

11. In an electrical measuring instrument for use over a relatively wide predetermined frequency band in combination with a high frequency transmission line having a tubular conductor, a hollow conductive body for mounting on the line, pick-up means supported by the conductive body and insulated from the latter for extending into the interior of the tubular conductor from the interior of the hollow conductive body so as to be subjected to the field of electrical wave energy transmitted along the line, a direct current measuring circuit connected across the pick-up means and the conductive body, said measuring circuit including a rectifier and capacitor, the capacitor comprising an elongated inner element and an elongated outer element insulated from and surrounding the inner element in coaxial relation and constituting therewith an open coaxial line having an electrical length less than one quarter wave length over the entire frequency band of the instrument, the rectifier being characterized over said wide frequency band by increased output upon frequency increase and the stub capacitor being characterized over said wide frequency band by decreased impedance upon frequency increase, the rectifier and the capacitor having such characteristics and being so connected that over said relatively wide predetermined frequency band changes in capacitor impedance substantially compensate for changes in rectifier output resulting from frequency variation over the designed range.

12. In an electrical measuring instrument for use over a relatively wide predetermined frequency band in combination with a high frequency transmission line having a tubular conductor, a hollow conductive body for mounting on the line, means for capacitively dividing the voltage of electrical wave energy transmitted along the line, said voltage dividing means including pick-up means supported by the conductive body and insulated from the latter for extending into the interior of the tubular conductor from the interior of the hollow conductive body so as to be subjected to the field of electrical wave energy transmitted along the line and also including an open coaxial stub line functioning as a capacitor characterized by changes in impedance with frequency changes over said wide frequency band, a measuring circuit connected to the voltage dividing means, said measuring circuit including a rectifier characterized by changes in direct current output with frequency changes over said wide frequency band, the characteristics of the coaxial stub capacitor and the rectifier being complementally related over said wide frequency band to obtain responses in the measuring circuit substantially independent of frequency.

13. In combination with a coaxial line element having inner and outer conductors, voltage measuring means for use over a wide frequency range connected across the line element, said means including a pair of capacitors in series to divide the voltage across the line element, one of said capacitors comprising the inner conductor of the line element and a probe extending through the outer conductor of the line element and into the field between the inner and outer conductors, a rectifier shunting one of the capacitors, the latter capacitor comprising an open coaxial stub line having a center conductive element and an outer conductive element, the center element being insulated from the outer element, the said latter capacitor responding as a capacitance over the entire wide frequency range of the measuring means, and an indicator connected to the rectifier.

14. In combination with a coaxial line having inner and outer conductors, voltage measuring means for use over a wide frequency range connected across the line, said means including unequal capacitances in series to divide the voltage across the line, a rectifier shunting one of the series capacitances, the said one shunted capacitance comprising a coaxial stub line having a conductive center element and an outer conductive element, the center element being insulated from the outer element, the latter capacitance responding as a capacitance over the entire wide frequency range of the measuring means and being connected at one end to both another of the series capacitances and the rectifier, and a measuring circuit connected to said one shunted capacitance, said measuring circuit including a direct current indicator and a relatively high resistance-capacity filter combination.

15. In combination in a high frequency electrical measuring instrument for use over a wide frequency range, a coaxial line comprising spaced inner and outer conductors, a plurality of capacitances series connected across the line, one capacitance comprising an open coaxial stub line having a center conductive element and an outer conductive element, and a frequency sensitive circuit including a direct current indicator connected to said one of the series capacitances, the center element of the coaxial stub line being insulated from the outer element and having a substantially common point of connection to both another capacitance of the series and the frequency sensitive circuit, and the said one capacitor responding as a capacitance over the entire wide frequency range of the instrument.

16. In combination with a high frequency transmission line having a tubular conductor a device for measuring alternating electrical potential over a wide frequency range, said device comprising a capacitance voltage divider component that includes a hollow conductive body mounted on the tubular line conductor, a probe, insulating means supporting the probe in the body, the probe projecting into the tubular line conductor, the capacitance voltage divider component also including a capacitor connected between the probe and the hollow conductive body, said capacitor comprising an open coaxial line responding as a capacitance over the entire wide frequency range of the device, a current rectifier connected to the capacitor and characterized by increased sensitivity upon increased frequency over said wide frequency range, and a relatively high resistance circuit including a direct current indicator connected to the coaxial line capacitor.

References Cited in the file of this patent

UNITED STATES PATENTS

| | | |
|---|---|---|
| 879,061 | Pierce | Feb. 11, 1908 |
| 2,106,713 | Bowen | Feb. 1, 1938 |
| 2,111,595 | Leng | Mar. 22, 1938 |
| 2,321,521 | Salinger | June 8, 1943 |
| 2,404,797 | Hansen | July 30, 1946 |
| 2,423,506 | Landon | July 8, 1947 |
| 2,452,551 | Conant | Nov. 2, 1948 |
| 2,454,042 | Dettinger | Nov. 16, 1948 |
| 2,455,657 | Cork et al. | Dec. 7, 1948 |
| 2,488,378 | Coltman | Nov. 15, 1949 |
| 2,516,169 | Wong | July 25, 1950 |
| 2,550,689 | Gustafson | May 1, 1951 |
| 2,588,390 | Jones | Mar. 11, 1952 |

OTHER REFERENCES

Publication I, "A Method of Determining and Monitoring Power and Impedance of High Frequencies," by Morrison and Younker, published in Proceedings of Institute of Radio Engineers, vol. 36, pp. 212–216, Feb. 1948. (Copy in 171–95–23.)

Publication II, "Practical Analysis of Ultra High Frequency" by Meagher and Markley, published by RCA Service Company, Inc., Camden, New Jersey, August 1943. (Copy in Div. 69.)